United States Patent [19]

Acker

[11] 4,146,015

[45] Mar. 27, 1979

[54] SOLAR POOL HEATER

[75] Inventor: Loren C. Acker, Tucson, Ariz.

[73] Assignee: Engineering & Research Associates, Inc., Tucson, Ariz.

[21] Appl. No.: 831,803

[22] Filed: Sep. 9, 1977

[51] Int. Cl.² .............................. F24J 3/02; E04H 3/19
[52] U.S. Cl. .................................... 126/271; 4/172.12; 9/14
[58] Field of Search ................ 126/270, 271; 237/1 A; 9/11 A, 13, 14, 2 A; 4/172.12, 172.13, 172.11, 172.14; 138/106, 107, 147; 160/402, 399, 404, DIG. 15; 248/62, 58, 63; 242/74, 74.1, 74.2; 24/265 C, 257 R, 85 B, 259 R; 220/216, 225

[56] References Cited

U.S. PATENT DOCUMENTS

| | | | |
|---|---|---|---|
| 446,254 | 2/1891 | Forrester | 220/216 |
| 930,037 | 8/1909 | Brown | 242/74 |
| 2,335,666 | 11/1943 | Gorey | 242/74.2 X |
| 2,457,343 | 12/1948 | Braunschweiger | 24/265 C |
| 2,582,579 | 1/1952 | Bedford | 24/265 C X |
| 2,870,976 | 1/1959 | Linquist | 242/74.2 |
| 2,974,721 | 3/1961 | Thomas | 160/402 |
| 3,011,930 | 12/1961 | Dworak | 4/172.12 X |
| 3,084,739 | 4/1963 | Jaworski | 160/402 |
| 3,343,708 | 9/1967 | Haas | 220/225 |
| 3,464,479 | 9/1969 | Baker | 160/402 X |
| 3,547,306 | 12/1970 | Natterstad | 220/216 |
| 3,752,209 | 8/1973 | Swanson | 160/402 X |
| 3,872,522 | 3/1975 | Bennett et al. | 4/172.12 |
| 3,984,881 | 10/1976 | Gerlac | 4/172.12 X |
| 3,984,882 | 10/1976 | Forman et al. | 4/172.12 X |
| 4,002,187 | 5/1977 | Roberts | 126/271 |
| 4,028,750 | 6/1977 | Gustafsson | 4/172.12 |

FOREIGN PATENT DOCUMENTS 883770  12/1961  United Kingdom .................... 220/225

Primary Examiner—William F. O'Dea
Assistant Examiner—Larry Jones
Attorney, Agent, or Firm—Cahill, Sutton & Thomas

[57] ABSTRACT

A solar pool heater is defined by a submersible tubular ring attached to the perimeter of a floating sheet. The ring is perforated to permit the entry of water within the ring to induce at least partial submersion. The submersed ring prevents overlapping of adjacent heaters and reduces the likelihood of the heaters being blown off the pool by wind. The sheet includes a plurality of captive air bubbles to provide a floatation capability while simultaneously insulating the water surface from the ambient air. By developing the sheet from material transparent to at least a spectrum of the solar rays, the underlying water will become heated by the received radiant energy.

21 Claims, 8 Drawing Figures

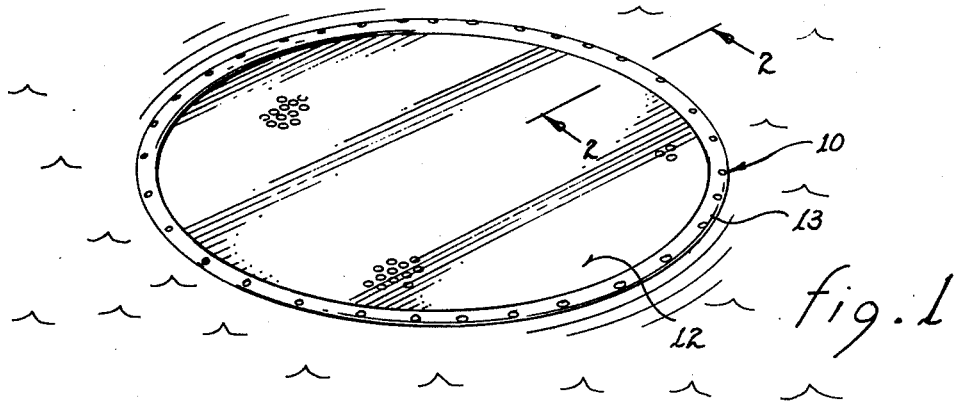
fig. 1
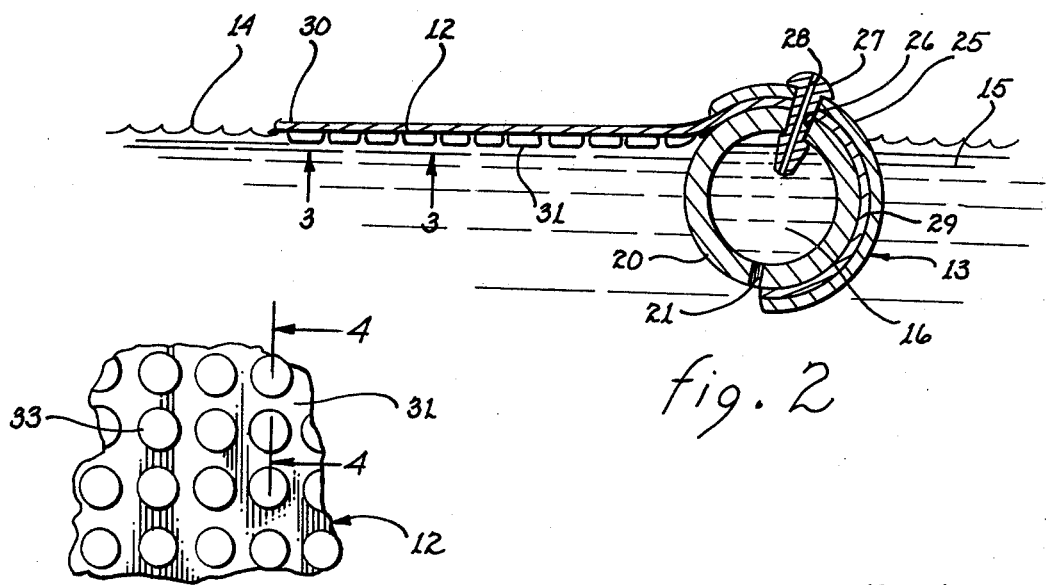
fig. 2
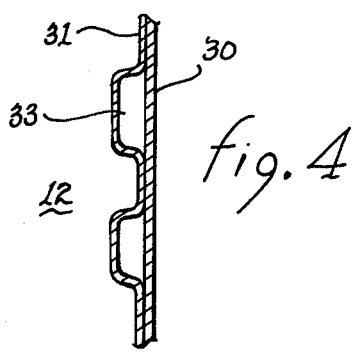
fig. 3
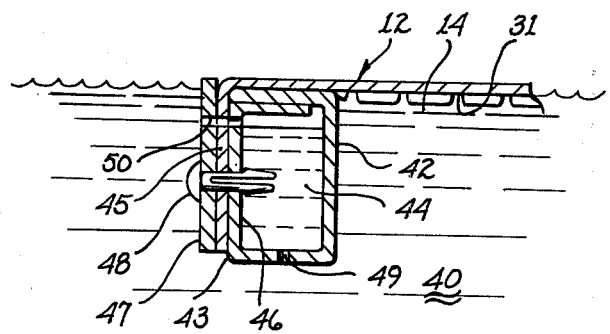
fig. 4
fig. 5

SOLAR POOL HEATER

The present invention relates to pool heaters and, more particularly, to partially submerged floating pool heaters.

With the high costs of electricity, gas, oil and solid fuels, non-essential uses thereof must be abandoned or at least curtailed. The heating of swimming pools, particularly residential swimming pools, is a luxury. For this reason, many communities have refused to issue permits for new installations of pool heating devices which receive power from municipal power sources. Moreover, many existing pool heaters have been disconnected or simply not turned on because of the very high attendant utility bills.

Since solar energy is generally abundant wherever pools are normally located, various solar responsive pool heating elements have been developed. The simplest of these devices includes a hollow ring secured to the perimeter of a circular sheet of plastic. Such a device floats on top of the water and serves the purpose of reducing heat loss through evaporation of the water and, when heated by the sun, transfers by heat conduction to the underlying water. A more sophisticated device is described in U.S. Pat. No. 3,893,443, wherein a plurality of rectangular shaped hollow devices float upon the surface of the water to partially or completely cover the pool. U.S. Pat. No. 3,984,882, describes a pool heater constructed from a cylindrical section having a sealed annular cavity for floatation and an annular depression for lockingly engaging the perimeter of a membrane disposed across one end of the cylindrical section. U.S. Pat. No. 3,949,095, is directed to a plurality of inflatable floatable members serially connected to one another and serving as an elongated cavity for a pumped fluid.

Hollow disc-shaped or rectangularly shaped elements floating upon a pool surface are disclosed in U.S. Pat. No. 4,022,187. A further device recently appearing upon the market is that of a floating membrane cut to mate with the perimeter of a pool and extending across the complete water surface of the pool.

All of the above described devices do, to a greater or lesser extent, aid in the use of solar energy to heat a pool. Moreover, because each of them covers at least a part of the pool water surface, retention of heat by precluding the cooling effect of evaporation is accomplished. However, each of the devices appears to suffer from one or more drawbacks. Those devices which float and are minimally immersed in the pool water are often blown away by a gust of wind. Those devices which are lightweight will, because of wave motion in combination with wind or by wind alone, at least partially overlap one another and thereby preclude maximum surface contact area with the water. Those devices which occupy the complete or a major area of the pool in order to operate satisfactorily, generally preclude swimming or other activities within the pool unless they are first removed. Many of the devices preclude the use of pool cleaners of the skimmer type.

In the preferred embodiment of the present invention, a ring is supportingly attached to the perimeter of a circular floating membrane having multiple air pockets disposed therein. The ring includes a tubular annulus and an annular cap, semi-cylindrical in cross-section, which cap mates with the tubular annulus to retain the perimeter of the membrane therebetween by means of locking studs or prongs. The side wall of the tubular annulus is apertured or perforated to permit an inflow of water and effect at least partial submersion of the ring.

Accordingly, it is a primary object of the present invention to provide a partially submerged solar pool heater.

Another object of the present invention is to provide a solar pool heater having a partially submerged perimeter to prevent overlapping of adjacent floating pool heaters.

Still another object of the present invention is to provide a solar pool heater having an essentially submerged perimeter to prevent the wind from blowing thereunder.

Yet another object of the present invention is to provide a solar pool heater having a floatable membrane surrounded by a submersible ring.

A further object of the present invention is to provide a solar pool heater having a floating insulating membrane.

A still further object of the present invention is to provide a simple means for mechanically attaching the perimeter of a solar pool heater membrane to a ring.

A yet further object of the present invention is to secure the perimeter of a solar pool heater membrane intermediate a tubular annulus and a cap.

These and other objects of the present invention will become apparent to those skilled in the art as the description thereof proceeds.

The present invention may be described with greater specificity and clarity with reference to the following drawings, in which:

FIG. 1 is a perspective view illustrating the solar pool heater resting upon a water surface;

FIG. 2 is a cross-sectional view taken along lines 2—2, as shown in FIG. 1;

FIG. 3 is a bottom view of the membrane taken along lines 3—3, as shown in FIG. 2;

FIG. 4 is a cross-sectional view of the membrane taken along lines 4—4, as shown in FIG. 3;

FIG. 5 illustrates a first variant of the present invention;

Figure 6:
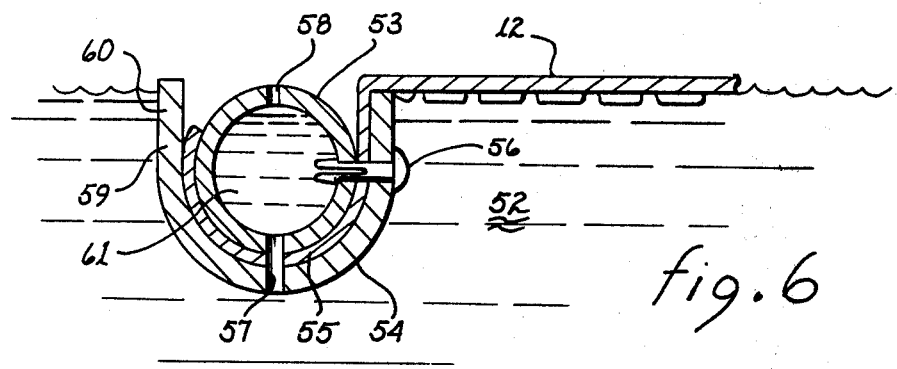
FIG. 6 illustrates a second variant of the present invention.

Referring to FIG. 1, solar pool heater 10 includes a membrane 12 circumscribed by a ring 13. When resting upon a surface of water, such as pool surface 14, the pool heater performs several functions simultaneously.

Membrane 12, if transparent to at least a spectrum of the solar radiation, permits transmission of radiant energy therethrough to heat the underlying water and pool bottom. The radiant heat emanating from the heated pool bottom and water will not penetrate the membrane and will be deflected back into the water. This process is generally referred to as the "greenhouse effect" and will produce substantial heating of the pool water.

By developing membrane 12 from material having air pockets disposed therein, the membrane will serve as an insulator to reduce heat loss therethrough by reducing heat conduction from the water surface to the ambient air. Additionally, the air pockets act as individual floatation elements to support the membrane and additional weight upon the water surface.

Since the membrane lies adjacent the water surface, it will also tend to preclude evaporation off the adjacent water and avoid the heat losses attendant evaporation.

The material of membrane 12 may be of the type commercially available and generally used for packing.

Ring 13 serves several different functions. It maintains membrane 12 in an essentially planar configuration for maximum continuous contact with the pool water surface. By immersing or submersing ring 13, additional benefits are achieved. That is, the immersed ring will render it difficult for the wind to get under solar pool heater 10 and blow it off the pool. When several solar pool heaters are employed in the same pool, the weight of the submersed rings will tend to preclude the perimeters of the pool heaters from being raised above the water surface. Consequently, there is little likelihood that the pool heaters will overlap one another with an attendant reduction in effectiveness. Instead of overlapping one another, the solar pool heaters will simply and harmlessly bump against one another.

Referring to FIG. 2, the constructional details of both the membrane and the ring will be reviewed. Ring 13 includes a tubular annulus 20 having a plurality of apertures 21 in fluid communication with water 15 for introducing water into the tubular annulus. These apertures permit unrestricted water flow into and out of the cavity defined by tubular annulus. Venting of cavity 16 may occur through hole 26 for prong 27, through a channel 28 extending through the prong or other vent holes. An annular cap 25, semi-circular in cross-section, closely mates with the lateral and upper exterior surface of tubular annulus 20. The cap is secured thereto by each of a plurality of prongs 27 penetrating both the cap and the tubular annulus. An annular section 29 of membrane 12 is attached to the tubular annulus by partially wrapping an annular section about the tubular annulus and covering the wrapped section by the cap. By securing the cap to the tubular annulus with locking studs or prongs 27, a gripping action occurs to secure membrane 12 to tubular annulus 20.

Membrane 12 is developed from commercially available sheets having a smooth side 30 and a pebbled side 31 wherein each of the "pebbles" is a sealed air pocket 33. Generally, these air pockets are disc-shaped as illustrated in FIGS. 3 and 4. Since the air pockets are disposed intermediate the tubular annulus and the cap and at least partially compressed by the clamping force of the cap, the force exerted by the air pockets will aid retention of the membrane. Alternately, the air pockets may be burst to permit a closer fit of the cap.

The air pockets serve as buoyant elements to preclude sinking of the solar pool heater regardless of the lack of buoyancy of the tubular annulus. Additionally, they serve an insulated compartments to diminish heat losses by heat conduction from water 15 to the ambient air. A plurality of solar heaters may be stacked without fear of overheating, even in direct sunlight, because the tubular ring separates the adjacent membrane and will permit sufficient ventilation to preclude destructive heat buildup. As it is contemplated that the solar pool heaters will be used in a pool during use of the pool by swimmers, buoyant membrane 12 has the potential of serving as a lifesaving device by supporting a swimmer in distress.

In use, solar pool heaters are not attached to one another and are free to float at random across the pool. Since they are easily pushed aside, they need not be removed during conventional use of the pool. Moreover, for pools having surface skimmers, the cleaning operation of the skimmers is not precluded or even diminished by the solar pool heaters as the latter will readily and easily be pushed away during passage of the skimmer.

By varying the number of solar pool heaters employed, the temperature of water 15 can be generally maintained despite a range of seasonal changes and the presence or absence of sunlight by adding or removing one or more of the solar pool heaters.

To reduce the possibility of the wind lifting the solar pool heaters into overlapping relationship and thereby reduce their effectiveness, both the apertured tubular annulus and the cap may be constructed from plastic having a specific gravity essentially that of the pool water. Thereby, on filling of the cavity in the tubular annulus with water through apertures 21, the ring will become partially or completely submersed, as illustrated. Such submersion, in combination with the weight of the water filled ring, will essentially preclude the wind from acting upon the solar pool heater with sufficient force to raise the ring sufficiently to overlap an adjacent solar pool heater. Moreover, the likelihood of the wind penetrating beneath the solar pool heater with sufficient force to flow the solar pool heater off the pool is very remote.

On lifting of the solar pool heaters from the pool, the water within the cavity in the tubular annulus will immediately begin to drain through apertures 21 and any vent holes. Thus, the lack of buoyancy of the ring will not penalize the out of water light weight, the handling and the ease of storability of the solar pool heaters.

Referring to FIG. 5, there is shown a first variant 40 of the present invention. Tubular annulus 42 is developed with a rectangular cross-section defining a cavity 44, as illustrated. With the resulting outer cylindrical surface 43, the cap for retaining annular section 45 of membrane 12, may be a simple inexpensive circular band 47. A prong 48 extends through band 47, annular section 45 and the side wall 46 of tubular annulus 45 to grip and retain these elements adjacent one another. Apertures 49 are disposed in the bottom wall of tubular annulus 42 to permit a flow of water into cavity 44; vents 50 may be incorporated to vent the air within the cavity and thereby promote filling the cavity with water. It may be noted that vents 50 should not extend radially inwardly of the tubular annulus toward the membrane in order to minimize the amount of air intermediate water surface 14 and surface 31 of membrane 12.

Through the construction of the ring illustrated in FIG. 5, the configuration of the essentially cylindrical outer surface of band 47 will further aid in precluding adjacent solar pool heaters from overlapping one another. That is, adjacent solar pool heaters will simply bump against one another without having any tendency to ride up on one another, as might be true were the contacting surfaces inclined.

FIG. 6 illustrates a second variant 52 of the ring. Tubular annulus 53 is circular in cross-section and defines a cavity 61. The cap is configured as a U-shaped member 54 having the central portion thereof curved in mating relationship with the tubular annulus. Annular section 55 of membrane 12 is disposed intermediate the lower semicircular surface of tubular annulus 53 and the adjacent interior surface of U-shaped member 54. The U-shaped member and the annular section are maintained in place by means of prongs, such as prong 56. Apertures, such as aperture 57 extend through the U-shaped member, the annular section and the tubular annulus permit a flow of water into cavity 61. Vents, such as vent 58, permit evacuation of the air within the cavity and aid the filling of the cavity with water. Leg or section 59 of U-shaped member 54 extends vertically upwardly and defines a cylindrical surface 60. This cylindrical surface serves as the contact point or bumper between adjacent solar pool heaters. Since surface 60 is cylindrical and vertically oriented, the probability of adjacent solar pool heaters becoming overlapped is very remote. Additionally, the constructional configuration of the U-shaped member adds rigidity and robustness to the ring. Hence, the ring will tend to resist deformation and damage despite misuse or rough treatment of the solar pool heater.

Figure 7:
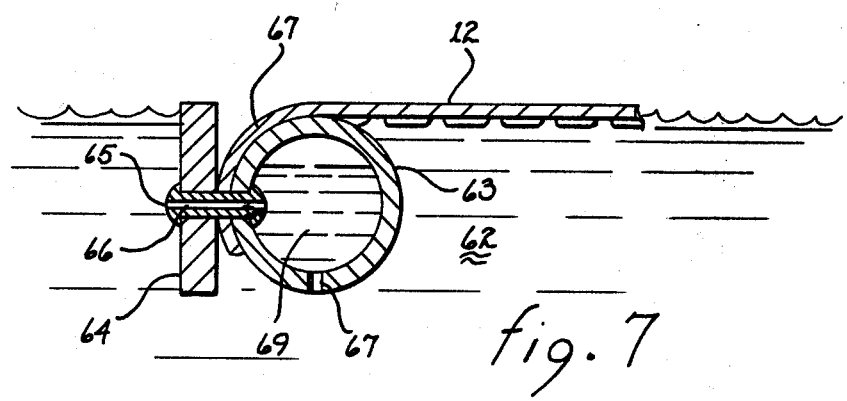
FIG. 7 illustrates a third variant of the present invention.

FIG. 7 illustrates a third variant 62 of the ring. Tubular annulus 63 is circular in cross-section and defines a cavity 69. The cap is a circular band 64 secured to the outer radial edge of tubular annulus 63 by a prong 65. The prong may include a passageway 66 for venting cavity 69. Apertures, such as aperture 67, are disposed in the lower side wall of the tubular annulus to permit an inflow and drainage of water. Annular section 68 of membrane 12 is disposed intermediate tubular annular 63 and band 64 and is retained in place by the force exerted by the prong through the cap.

Figure 8:
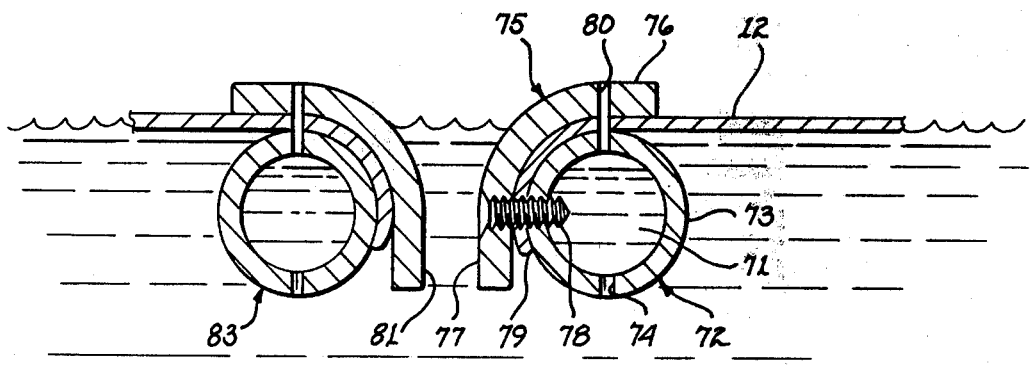
FIG. 8 illustrates a fourth variant of the present invention.

A fourth variant 72 is illustrated in FIG. 8. Tubular annulus 73 is circular in cross-section and defines a cavity 71. The tubular annulus includes apertures, such as aperture 74, disposed through the lower side wall thereof. A cap 75 is formed as a quarter-round element having horizontal and vertical lateral surfaces 76, 77, respectively. The curvature of cap 75 mates with the adjacent surface of tubular annulus 73, as indicated. Prongs or screws, such as screw 78, secure the cap to the tubular annulus and maintain annular section 79 of membrane 12 therebetween. Vents, such as vent 80, may be employed to vent the air from cavity 71. Alternatively, screw 78 may be slotted or include a passageway for venting the air.

As indicated in FIG. 8, the downwardly extending vertical surface 77, defining essentially a cylinder, is the surface which will contact a similar surface 81 of an adjacent ring 83. As the contacting surfaces are vertical and not inclined, there exists little mechanical persuasion for the bumping or butting solar pool heaters to overlap one another as a result of a collision.

It may be noted that in each one of the variants, as with the preferred embodiment, the upper part of the annular ring is essentially coincident with the water surface. Such coincidence provides little surface area upon which the wind may act. Accordingly, it is unlikely that a sufficient wind induced force can be generated to drive one solar pool heater against one another with sufficient momentum to cause them to ride upon and overlap one another. The added weight of the water filled annular rings tends to preclude the raising of any portion of the ring above the water surface except under relatively severe wave conditions; even then, the weight of the water filled annular ring will require a substantial wind force to blow the solar pool heater off the pool. Accordingly, it is highly unlikely that solar pool heaters constructed in accordance with the present invention will overlap one another or be blown off pools, as is common with related devices.

Various types of mechanical devices may be employed to lock or secure the cap to the tubular annulus. The prongs and the screw illustrated in the drawings are simply representative of two types of devices which are inexpensive and relatively easily installed. More complex means, such as adhesives, heat bonding, or chemical bonding may be employed.

The venting of the tubular annulus may take any one of the forms illustrated or may even be omitted depending upon both the location and size of the water inflow apertures. Alternatively, slots or the like may be located within the side walls of the tubular annulus to perform the functions of filling and draining the cavity within the ring.

While the principles of the invention have now been made clear in an illustrative embodiment, there will be immediately obvious to those skilled in the art many modifications of structure, arrangement, proportions. elements, materials, and components, used in the practice of the invention which are particularly adapted for specific environments and operating requirements without departing from those principles.

I claim:

1. A solar pool heater for raising the temperature of the water in a pool, said solar pool heater comprising in combination:
   a. a floating membrane for convering an area of the water surface in the pool;
   b. means disposed about the perimeter of said membrane for maintaining said membrane in a planar configuration, said maintaining means includes a cavity; and
   c. means for introducing pool water into the cavity of said maintaining means to reduce the buoyancy of said maintaining means;
   whereby, said maintaining means is at least partially submerged to anchor said solar pool heater in the water and said floating membrane supports said solar pool heater on the surface of the water.

2. The solar pool heater as set forth in claim 1 wherein said maintaining means comprises a ring.

3. The solar pool heater as set forth in claim 2 wherein said introducing means comprises at least one aperture for providing fluid communication between the pool water and the cavity within said ring.

4. The solar pool heater as set forth in claim 3 wherein said ring comprises:
   a. a tubular annulus for defining the cavity; and
   b. a cap for securing said membrane to said tubular annulus.

5. The solar pool heater as set forth in claim 4 wherein said floating membrane includes an annular section for engagement intermediate said tubular annulus and said cap.

6. The solar pool heater as set forth in claim 5 including locking means for securing said cap and said annular section to said tubular annulus.

7. The solar pool heater as set forth in claim 6 wherein said tubular annulus is circular in cross-section and wherein said cap is curved in cross-section.

8. The solar pool heater as set forth in claim 6 wherein said tubular annulus is circular in cross-section and wherein said cap is a circular band.

9. The solar pool heater as set forth in claim 8 wherein the peripheral surface of said cap is normal to the plane of said floating membrane.

10. The solar pool heater as set forth in claim 6 wherein said tubular annulus is circular in cross-section and said cap is U-shaped in cross-section.

11. The solar pool heater as set forth in claim 10 wherein the peripheral surface of said cap is normal to the plane of said floating membrane.

12. The solar pool heater as set forth in claim 6 wherein said tubular annulus is rectangular in cross-section and wherein said cap is a circular band.

13. The solar pool heater as set forth in claim 12 wherein the peripheral surface of said cap is normal to the plane of said floating membrane.

14. The solar pool heater as set forth in claim 6 wherein said floating membrane includes a plurality of individual air pockets.

15. The solar pool heater as set forth in claim 14 wherein said floating membrane includes a smooth surface and a pebbled surface for making contact with the water surface of the pool.

16. The solar pool heater as set forth in claim 1 wherein said maintaining means comprises a tubular member.

17. The solar pool heater as set forth in claim 16 wherein said introducing means comprises at least one aperture in the wall of said tubular member.

18. The solar pool heater as set forth in claim 17 wherein said maintaining means is disposed on one side of the plane defined by said floating membrane.

19. The solar pool heater as set forth in claim 18 including means for gripping and retaining a section of said floating membrane adjacent said tubular member.

20. The solar pool heater as set forth in claim 19 wherein said gripping and retaining means comprises a cap and means for locking said cap to said tubular member and securing said section of said floating membrane intermediate said cap and said tubular member.

21. The solar pool heater as set forth in claim 1 including a vent disposed in said membrane.

* * * * *